United States Patent [19]

Vadovic et al.

[11] 4,057,512

[45] Nov. 8, 1977

[54] ALKALI METAL CATALYST RECOVERY SYSTEM

[75] Inventors: Charles J. Vadovic, LaPorte; Robert D. Wesselhoft; Nicholas C. Nahas, both of Baytown, all of Tex.

[73] Assignee: Exxon Research & Engineering Co., Linden, N.J.

[21] Appl. No.: 618,292

[22] Filed: Sept. 29, 1975

[51] Int. Cl.[2] .................. C01D 5/02; C01D 13/00; C01F 7/34; C01B 33/12
[52] U.S. Cl. ........................... 252/413; 48/197 R; 48/202; 48/210; 201/17; 252/411 R; 209/214; 423/127; 423/132; 423/206 R; 423/339
[58] Field of Search ............. 252/413, 420; 423/202, 423/205, 206, 208, 118, 119, 132, 127, 461; 75/101 R; 201/17; 48/202

[56] References Cited

U.S. PATENT DOCUMENTS

| | | | |
|---|---|---|---|
| 1,845,815 | 2/1932 | Riddle | 252/425 |
| 2,141,132 | 12/1938 | Folger | 423/127 |
| 2,754,273 | 7/1956 | Shabaker | 252/413 |
| 3,393,978 | 7/1968 | Murphy et al. | 201/17 |
| 3,481,695 | 12/1969 | Hite | 423/132 |
| 3,615,299 | 10/1971 | Fischer | 48/204 |
| 3,615,300 | 10/1971 | Holm | 48/206 |
| 3,625,354 | 12/1971 | Heitmann | 209/214 |
| 3,847,567 | 11/1974 | Kalina | 48/202 |
| 3,860,514 | 1/1975 | Lee | 209/214 |
| 3,873,427 | 3/1975 | Long et al. | 423/461 |
| 3,929,431 | 12/1975 | Koh et al. | 48/214 |
| 3,957,459 | 5/1976 | Mitchell et al. | 48/202 |
| 3,998,607 | 12/1976 | Wesselhoft et al. | 252/413 |

*Primary Examiner*—Winston A. Douglas
*Assistant Examiner*—P. E. Konopka
*Attorney, Agent, or Firm*—James E. Reed

[57] ABSTRACT

In a coal gasification operation or similar process carried out in the presence of an alkali metal-containing catalyst wherein spent solids containing ash and alkali metal catalyst residues are produced, alkali metal constituents are recovered from the spent solids by first removing magnetic constituents from the solids, contacting the solid particles from which magnetic constituents have been separated with an acid solution to extract alkali metal constituents from the solids and produce a spent acid solution enriched in alkali metal salts, raising the pH of the enriched solution sufficiently to precipitate aluminum from the solution as aluminum hydroxide, heating the remaining solution to precipitate silicon compounds, and recovering an enriched alkali metal solution from which aluminum and silicon compounds have been removed. This process permits the effective recovery of alkali metal catalyst constituents, eliminates iron compounds and other inactive constituents which may otherwise tend to build up in the catalyst system, and makes possible the recovery of aluminum as a valuable by-product of the process.

16 Claims, 1 Drawing Figure

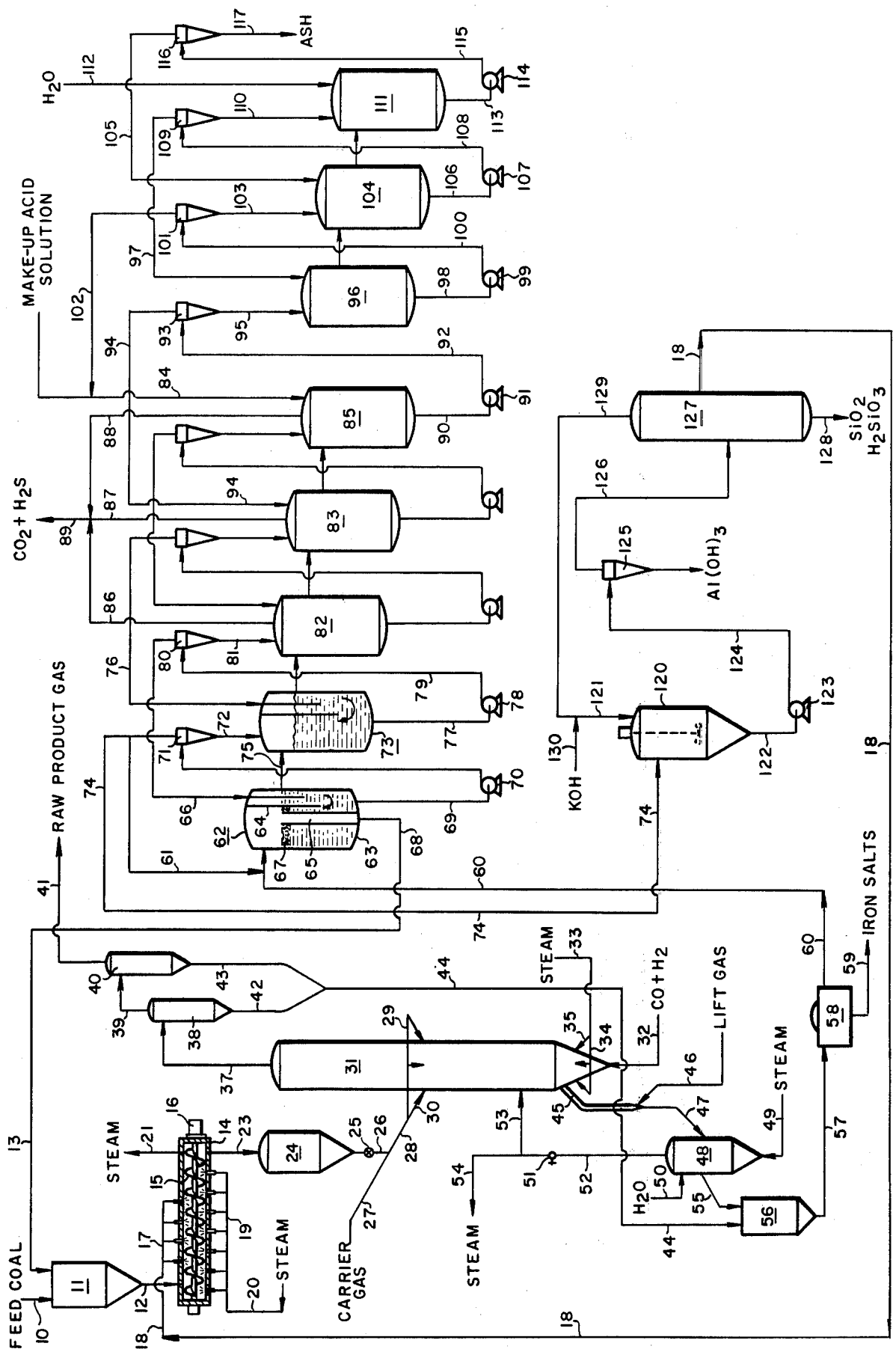

ALKALI METAL CATALYST RECOVERY SYSTEM

BACKGROUND OF THE INVENTION

1. Field of the Invention

This invention relates to the treatment of coal and similar carbonaceous solids in the presence of alkali metal-containing catalysts and is particularly concerned with the recovery of alkali metal constituents from spent solids produced during coal gasification and similar operations.

2. Description of the Prior Art

Potassium carbonate, cesium carbonate and other alkali metal compounds have been recognized as useful catalysts for the gasification of coal and similar carbonaceous solids. The use of such compounds in coal liquefaction, coal carbonization, coal combustion and related processes has also been proposed. To secure the higher reaction rates made possible by the presence of the alkali metal compounds, it has been suggested that bituminous coal, subbituminous coal, lignite, petroleum coke, oil shale, organic wastes, and similar carbonaceous materials be mixed or impregnated with potassium, cesium, sodium or lithium compounds, alone or in combination with other metallic constituents, before such materials are reacted with steam, hydrogen, oxygen or other agents at elevated temperatures to produce gaseous effluents. Studies have shown that a wide variety of different alkali metal compositions can be used for this purpose, including both organic and inorganic salts, oxides, hydroxides and the like. Because of their relatively low cost and ready availability, inorganic salts such as potassium carbonate, cesium carbonate and mixtures of these and similar materials with other metallic compounds are generally preferred.

Coal gasification processes and similar operations carried out in the presence of alkali metal compounds at temperatures below about 2200° F. generally result in the formation of chars and alkali metal catalyst residues. The chars normally include unconverted constituents of the coal or other feed material and various inorganic constituents generally referred to as ash. The amount of ash which is present depends in part on the composition of the feed material, the gasification or other reaction conditions employed, and the residence time of the particles within the reaction zone. It is generally advisable to withdraw a portion of the char from the reaction zone during gasification operations in order to eliminate the ash and keep it from building up within the gasifier or other vessels in the system. Elutriation methods and other techniques for separating char particles of relatively high ash content and returning particles of relatively low ash content to the reaction zone in order to improve utilization of carbon in such processes have been suggested.

There have been proposals for the recovery of alkali metal catalyst residues withdrawn from the reaction zone with the char during operations of the type referred to above by leaching out the alkali metal constituents. Studies indicate that these constituents are generally present in part as carbonates or other water-soluble compounds which can be recovered by water washing. More recent work has shown, however, that some of the alkali metal constituents may also be present in the char as insoluble compounds which are not readily susceptible to recovery by such techniques. Alkali metal compounds have been used as catalysts in coal gasification and similar operations to only a limited extent and hence relatively little work has been done in this area in the past.

SUMMARY OF THE INVENTION

The present invention provides an improved process for the recovery of alkali metal catalyst residues from mixtures of char and ash produced during coal gasification and similar operations. In accordance with the invention, it has now been found that alkali metal compounds can be effectively recovered from coal char and similar carbonaceous solids produced during coal gasification and related high temperature operations by first removing magnetic iron components from the solid particles, thereafter contacting the remaining solids with an acid solution in a multistage, countercurrent liquid-solids extraction system to extract both water-soluble and acid-soluble alkali metal constituents from the solid particles and produce a spent acid solution enriched in alkali metal compounds, raising the pH of the spent solution sufficiently to precipitate aluminum as aluminum hydroxide, heating the remaining solution to precipitate silicon compounds, and recovering a relatively concentrated alkali metal solution from which aluminum and silicon have been removed. This process has numerous advantages over processes suggested in the past in that it results in the removal from the carbonaceous solids and enriched solution of metallic constituents which may otherwise tend to accumulate in the system or tie up alkali metal constituents and prevent their recovery, makes possible the recovery of alkali metal constituents in greater quantities than can generally be recovered by other processes, permits the recovery of substantial quantities of aluminum as a valuable by-product of the process, and has no other benefits. As a result, the process has potential application in a wide variety of gasification and similar processes in which alkali metal compounds are employed to catalyze high temperature reactions.

BRIEF DESCRIPTION OF THE DRAWING

The drawing is a schematic flow diagram of a catalytic coal gasification process in which alkali metal catalyst constituents are recovered for reuse and other metallic constituents are recovered as by-products from carbonaceous solids produced in the process.

DESCRIPTION OF THE PREFERRED EMBODIMENTS

The process depicted in the drawing is one for the production of methane by the gasification of bituminous coal, subbituminous coal, lignite or similar carbonaceous solids with steam at high temperature in the presence of a carbon-alkali metal catalyst prepared by impregnating the feed solids with a solution of an alkali metal compound and thereafter heating the impregnated material to a temperature sufficient to produce an interaction between the alkali metal and the carbon. It will be understood that the invention is not restricted to this particular gasification process and can be employed in conjunction with any of a variety of other processes in which alkali metal compounds or carbon-alkali metal catalysts are used to promote the reaction of steam, hydrogen, oxygen or the like with carbonaceous feed materials and a char, coke or similar solid product containing alkali metal catalyst residues is recovered. It can be employed, for example, for the recovery of alkali metal catalyst residues and the like from various processes for the gasification of coal, petroleum coke, lignite, organic waste materials and similar solid feed streams which produce spent carbonaceous solids at temperatures below the ash fusion point. Other processes with which it may be used include operations for the carbonization of coal and similar feed solids, for the liquefaction of coal and related carbonaceous feed materials, for the retorting of oil shales and the like, for the partial combustion of carbonaceous feed materials, and the like. Such processes have been described in the technical literature and will therefore be familiar to those skilled in the art.

In the process shown in the drawing, a solid carbonaceous feed material such as bituminous coal, subbituminous coal, lignite or the like which has been crushed and screened to a particle size of about eight mesh or smaller on the Tyler Screen Scale, preferably less than about twenty Tyler mesh, is fed into the system through line 10 from a coal preparation plant or storage facility which does not appear in the drawing. The solids introduced through line 10 are fed into a hopper or similar vessel 11 from which they are passed through line 12, together with recycled solids admitted by means of line 13, into feed preparation zone 14. The feed preparation zone shown contains a screw conveyor or similar device 15 which is powered by a motor 16, a series of spray nozzles or similar devices 17 for the spraying of an alkali metal salt solution recycled through line 18 onto the solids as they are moved through the preparation zone by the conveyor, and nozzles or the like 19 for the introduction of steam from line 20 into the preparation zone to heat the impregnated solids and drive off moisture. It is generally preferred that sufficient alkali metal salt solution be introduced into the preparation zone to provide from about 1 to about 50% by weight of the alkali metal compound on the coal or other carbonaceous solids. From about 1 to about 15 weight percent generally is adequate. Steam is withdrawn from zone 14 through line 21 and will normally be passed to a condenser or heat exchanger not shown in the drawing for the recovery of heat and condensate which can be used as makeup water or the like.

The dry impregnated solid particles prepared in feed preparation zone 14 are withdrawn through line 23 and passed to a feed hopper or similar vessel 24. From here they are discharged through a star wheel feeder or equivalent device 25 in line 26 at an elevated pressure sufficient to permit their entrainment into a stream of high pressure steam, recycle product gas, inert gas or other carrier gas introduced into the system through line 27. The carrier gas and entrained solids are passed through line 28 into manifold 29 and fed through multiple feed lines 30 and nozzles not shown in the drawing into gasifier 31. In lieu of or in addition to hopper 24 and star wheel feeder 25, the feed system employed may include parallel lock hoppers, pressurized hoppers, aerated standpipes operated in series, or other apparatus for raising the input feed solid stream to the required pressure level. It is generally preferred to operate the gasifier at a pressure between about 500 and about 2000 psig. The carrier gas and entrained solids will normally be introduced at a pressure somewhat in excess of the gasifier operating pressure.

The carrier gas employed to convey the feed solids into the gasifier may be preheated to a temperature in excess of about 300° F. but below the initial softening point of the coal or other feed material employed. Temperatures between about 300° F. and about 800° F. are generally preferred. The feed particles may be suspended in the gas stream at a concentration between about 0.2 and about 5.0 pounds of solid feed material per pound of carrier gas. The optimum ratio for a particular system will depend in part upon the feed particle size and density, the molecular weight of the gas employed, the temperature of the solid material and input gas stream, the amount of alkali metal compound employed, and other factors. Generally speaking, ratios between about 0.5 and about 4.0 pounds of solid feed material per pound of carrier gas are preferred.

The gasifier 31 employed in the system of the invention will normally comprise a refractory-lined vessel containing a fluidized bed of carbonaceous solids extending upwardly within the vessel above an internal grid or similar distribution device which does not appear in the drawing. The bed is maintained in the fluidized state by means of a stream of recycled hydrogen and carbon monoxide introduced through bottom inlet line 32 and steam supplied to the gasifier through line 33, manifold 34, and peripherally spaced injection lines and nozzles 35. The particular injection system shown is not critical and hence other methods for injecting the steam and the recycle hydrogen and carbon monoxide may be employed. In some instances, for example, it may be preferred to introduce both the steam and recycle gases through multiple nozzles to obtain more uniform distribution of the injected fluids and reduce the possibility of channeling and related problems. The space velocity of the upflowing gases within the fluidized bed with normally range between about 300 and about 3000 volumes of steam and recycled hydrogen and carbon monoxide per hour volume of fluidized solids.

Within the gasifier, the injected steam reacts with carbon in the feed material in the fluidized bed at a temperature within the range between about 800° F. and about 1600° F. and at a pressure between about 500 and about 2000 psia. Due to the equilibrium conditions existing in the bed as a result of the presence of the carbon-alkali metal catalyst and the recycled hydrogen and carbon monoxide injected near the lower end of the bed, the reaction products will normally consist primarily of methane and carbon dioxide. Competing reactions which in the absence of the catalyst and recycled gases would ordinarily tend to produce additional hydrogen and carbon monoxide are suppressed. The ratio of methane to carbon dioxide in the raw product gas thus formed will preferably range from about 1 to about 1.4 moles per mole, depending on the amount of hydrogen and oxygen in the feed coal or other carbonaceous solids. The coal employed may be considered as an oxygenated hydrocarbon for purposes of describing the reaction. Wyodak coal, for example, may be considered as having the approximate formula $CH_{0.84}O_{0.20}$, based on the ultimate analysis of moisture and ash-free coal and neglecting nitrogen and sulfur. The reaction of this coal with steam to produce methane and carbon monoxide is as follows:

$$1.24\ H_2O(g) + 1.8\ CH_{0.84}O_{0.20} \rightarrow 0.8\ CO_2 + CH_4.$$

Under the same gasification conditions, coals of higher oxygen content will normally produce lower methane-to-carbon dioxide ratios and those of lower oxygen content will produce higher methane-to-carbon dioxide ratios.

The hot gas leaving the fluidized bed and gasifier 31 passes through the upper section of the gasifier which serves as a disengagement zone where particles too heavy to be entrained by the gas stream are returned to the bed. This disengagement zone, if desired, may include one or more internal cyclone separators or the like for removing smaller particles from the gas. The gas withdrawn from the upper end of the gasifier through line 37 will normally contain methane and carbon dioxide produced by reaction of the steam with carbon, hydrogen and carbon monoxide introduced into the gasifier as recycle gas, unreacted steam, hydrogen sulfide, ammonia and other contaminants formed as a result of the sulfur and nitrogen contained in the feed material, and entrained fines. This gas is introduced into a cyclone separator or similar device 38 for removal of the larger fines. The gas taken overhead through line 39 passes through a second separator 40 where additional fines are taken off. The raw product gas is then taken overhead through line 41 and passed to downstream equipment for the recovery of heat, the removal of contaminants, and separation of the gas into a recycle stream of hydrogen and carbon monoxide and a product gas stream which may be used as a fuel or further processed in various ways. The fines taken out of the gas in separators 38 and 40 are withdrawn through lines 42 and 43 and then passed through line 44 to the catalyst recovery system.

During the gasification operation described above, solids are continuously withdrawn from the lower portion of the fluidized bed in gasifier 31 by means of descending solids withdrawal line 45. The withdrawn solids will normally consist of a mixture of char particles, ash and alkali metal residues from the carbon-alkali metal catalyst in the gasifier. The withdrawn solids flow downwardly through the withdrawal line countercurrent to a stream of steam or other elutriating gas introduced through line 46. Here a preliminary separation of the solids based on differences in size and density takes place. The lighter particles of relatively low ash content to be returned to the gasifier and the heavier particles of relatively high ash content continue downwardly through line 47 into fluidized bed withdrawal zone 48. Steam or other fluidizing gas is introduced into the bottom of the withdrawal zone through line 49 to maintain the bed in the fluidized state. Water will normally be introduced through line 50 in order to cool the particles and facilitate their further handling. The amount of water injected can be regulated so that essentially all of the injected water is vaporized. The rate at which particles are withdrawn into vessel 48 is controlled by regulating the pressure within the vessel by means of throttling valve 51 in overhead line 52. The gases from line 52 may be returned to the gasifier through line 53 or passed through line 54 for heat recovery and further handling. From vessel 48, the solid particles are passed through line 55 into hopper 56 where they may be combined with fines recovered from the raw product gas through line 44 and then fed through line 57 to the alkali metal recovery unit of the process. It will be understood that other systems for the withdrawal of solids from the gasifier, including intermittent withdrawal systems, can be employed in lieu of that shown in the drawing if desired.

The first step in the alkali metal recovery is the removal of magnetic constituents from the solid particles withdrawn from the gasifier. Studies have shown that most coals and other carbonaceous solid feed materials contain iron in significant quantities and may include other magnetic constituents. In the ash from United States bituminous coals for example, it has been reported that the iron content expressed as ferric oxide may range as high as 35% by weight. In ash from German coals, values as high as 45% by weight have been reported. Iron present in the char solids will tend to dissolve in acid used in later stages of the recovery process. The removal of magnetic constituents tends to prevent a buildup of iron compounds within the gasification system and also reduces the acid consumption in the process. This is illustrated by the results of laboratory tests in which magnetic constituents were first removed from coal char and then treated with concentrated sulfuric acid to determine their acid solubility. These results are set forth in Table I below.

TABLE I

| Sample | Magnetic Iron Salt Recovery | | | Percent Magnetic Fraction Dissolved in Acid |
|---|---|---|---|---|
| | Sample Weight (gms) | Weight Recovered Magnetically | Percent Recovered | |
| 1. | 34.47 | 4.99 | 14.5 | 56.6 |
| 2. | 29.00 | 4.23 | 14.6 | — |

The above data show that about 15% of each char sample was recovered by magnetic treatment and that about half of the recovered material was soluble in the acid. This material would tend to be extracted from the char solids with the alkali metal constituents on treatment of the solids with acid. By removing the magnetic constituents prior to the extraction step, this difficulty is alleviated.

Magnetic constituents are removed from the solids recovered from the gasifier by passing the solids stream from hopper 56 through line 57 to magnetic separator 58. This separator may be either a dry or wet unit and may be a belt-type machine, a rotary separator, an induced-roll separator or the like. A variety of different magnetic separators which may be employed for purposes of the invention are available commercially and will be familiar to those skilled in the art. The optimum type unit for a particular application will depend in part upon the iron content of the char solids, the solids particle size, and other factors. The magnetic materials recovered from separator 58 as indicated by line 59 may be employed for landfill purposes, fed to a blast furnace, or disposed of in other ways.

The nonmagnetic material recovered from separator 58 is withdrawn by means of line 60 and passed to the extraction stage of the process. If a wet magnetic separator is used, the water employed in the separator will normally include alkali metal constituents dissolved from the solids during the magnetic separation step. To prevent the loss of this material, the water may be passed to the extraction system along with the nonmagnetic solids. These solids will normally include relatively large char particles of low ash content which were not returned to the gasifier by elutriation at the time the solids were withdrawn.

The alkali metal extraction unit employed in the process of the invention is a multistage countercurrent unit including a plurality of open or closed tanks or vats, classifiers, screw-fed contactors, thickeners, continuous centrifuges or the like, The use of closed vats or tanks is generally preferred. In the particular multistage system shown, eight stages are employed but a greater or lesser number may be provided if desired. It is generally advantageous to utilize at least three stages in the recovery system for the contacting of solids with acid solution and at least two stages for the recovery of acid from the system but the optimum number of stages will depend to a large extent upon the composition of the solids fed to the system and the particular contacting conditions utilized. Each stage in the particular system shown includes a closed vat or tank, means for the countercurrent circulation of liquids and solids from one tank to another, and a hydroclone, filter, centrifuge or similar solids-liquid separation device.

Solids fed into the multistage countercurrent extraction system through line 60 are mixed with a stream of concentrated alkali metal solution introduced through line 61. The resultant slurry of liquid and solids is then discharged into the final stage 62 of the extraction system. This stage comprises a mixing tank 63 containing an upper internal baffle 64 which sets off a separate intake section in the upper portion of the tank and a lower cylindrical baffle 65 which forms an overflow discharge zone extending to the bottom of the tank. Alkali metal solution less concentrated than that in the final stage is introduced into stage 62 through line 66 from the preceding stage. This liquid flows downwardly through the intake portion of the vessel, around baffle 64, and upwardly into the main part of the vessel. Char particles of relatively high carbon content and relatively low ash content which are less dense than the liquid rise to the surface to form a char layer 67 which overflows into cylindrical baffle 65 and is withdrawn from stage 62 through line 68 for reintroduction into the feed preparation system through line 13. The heavier particles of relatively low carbon content and relatively high ash content are more dense than the liquid in stage 62 and therefore form a slurry in the lower portion of the vessel. Soluble alkali metal constituents present in the solid particles are in part extracted into the liquid phase by the liquid in contact with the particles. If desired, stage 62 and the other stages in the system can be provided with mechanical agitators or similar devices to improve the contacting efficiency and increase the amount of extraction or leaching which takes place.

The separation between low density-high carbon particles and high density-high ash particles which takes place in stage 62 of the process is an advantageous feature in that it permits the recycle of particles of high carbon content to the gasifier and thus improves the overall carbon utilization in the system. It will be understood, however, that this feature is not always essential and that the process can be carried out without the recycle of char particles of high carbon content to the feed preparation system if desired. The separation of high carbon, low ash particles for recycle can be carried out in a separate sink-float system independent of the acid extraction system and in some cases this may be advantageous.

The slurry which is formed in stage 62 is withdrawn from the bottom of the tank through line 69 and circulated by means of pump 70 to a hydroclone, centrifuge, filter or similar liquid-solid separation device 71 where solids are removed from the liquid. These solids, from which a portion of the soluble metal constituents has been extracted, are discharged through line 72 into stage 73 of the apparatus. The liquid recovered from the solids in the hydroclone or similar device 71 is richer in alkali metal constituents than the liquid in stage 73. This concentrated liquid is in part recycled through line 61 to the incoming stream in line 60 and in part passed through line 74 to the downstream portion of the system for the removal of aluminum and silicon compounds as described hereafter. The liquid level in stage 62 is maintained by withdrawing fluid from that stage through line 75 into stage 73.

In stage 73 of the extraction system, the solid particles introduced through line 72 are mixed with solution recycled from stage 62 through overflow line 75 and with liquid introduced through intake line 76. A slurry of liquids and solids having lower alkali metal contents than those in stage 62 is thus formed. A portion of the alkali metal constituents in the solids is extracted into the liquid phase. This slurry is withdrawn from stage 73 through line 77, pump 78 and line 79 for introduction into hydroclone or similar separation device 80. Here the solids are separated from the liquid and passed through line 81 to separation stage 82. The liquids are recycled overhead from the hydroclone through line 66 to stage 62.

Each of the five stages in the acid washing portion of the process as illustrated operates in similar fashion. In each stage, solids are contacted with acid solution and alkali metal constituents are extracted from the solid particles. The alkali metal content of the particles becomes less as the particles move from the terminal stage 62 toward the initial stage of 85 of the acid washing portion of the system. In stage 85, makeup acid solution is added to the system through line 84. Although any of a variety of acids which form soluble alkali metal salts may be used in this portion of the system, it is generally preferred to employ a formic or sulfuric acid solution produced from products generated in the gasification process. The formic acid can be generated, for example, by the reaction of steam with carbon monoxide in the presence of a copper-containing catalyst or by the reaction of carbon monoxide to form methanol and the subsequent oxidation of the methanol to yield formic acid. The use of carbon monoxide produced during the gasification reaction to generate formic acid in the required quantities improves the overall carbon utilization in the process still further and may therefore be advantageous. Alternatively, hydrogen sulfide recovered from the gaseous products can be oxidized to produce sulfuric acid suitable for use in the process. As indicated above, hydrochloric and other acids can be used if desired and it is not essential that these acids be produced from products made during the gasification operation.

The reaction of acid with alkali metal constituents present in the gasifier solids, some of which are generally present as carbonates, normally results in the production of carbon dioxide during the extraction operation. Some hydrogen and hydrogen sulfide are also generally produced. These gases are recovered from stages 82, 83 and 85 through lines 86, 87 and 88. The mixed gases thus produced may be passed by means of line 89 to an acid gas recovery unit for removal of the hydrogen sulfide and carbon dioxide. Hydrogen generated by the action of the acid remains in the gas discharged from the acid gas removal unit and may ultimately be recycled to the gasifier, burned as fuel, or used for other purposes.

The slurry withdrawn from the initial stage of the acid treating portion of the recovery train, stage 85, is composed of partially spent acid solution and ash particles which have a relatively low carbon content and contain only small amounts of soluble alkali metal constituents. This slurry is passed through line 90, pump 91 and line 92 into hydroclone or similar solids-liquid separation device 93 where the solids and liquid are separated. The bulk of the acid solution is taken overhead from the hydroclone or similar device through line 94 and returned to acid extraction stage 83. The solids and accompanying liquid recovered as underflow from the hydroclone is passed through line 95 into water washing zone 96. Here the solids and acid solution are mixed with liquid introduced through line 97. The resulting slurry, now more dilute with respect to the acid, is passed through line 98, pump 99 and line 100 to hydroclone or the like 101. The overhead liquid stream from the hydroclone, which includes significant quantities of acid, is passed through line 102 and mixed with makeup acid introduced into the system through line 84.

The underflow stream composed of solids and very dilute acid solution passed through line 103 into water washing stage 104. This stream is mixed with substantially acid-free water introduced through line 105 and then circulated through line 106, pump 107 and line 108 to hydroclone or the like 109. Liquids from the hydroclone pass overhead through line 97 to stage 104 and the solids and accompanying liquid recovered as underflow pass through line 110 into water washing stage 111. In this stage solids and accompanying fluid from the hydroclone are mixed with water introduced through the system through line 112. The water thus introduced removes any remaining acid from the solids to produce a slurry containing only trace amounts of acid. This slurry is withdrawn through line 113 and moved by means of pump 114 through line 115 to hydroclone 116. The overhead liquid stream from the hydroclone is recycled through line 105 to stage 104. The solids and a small amount of water are withdrawn through line 117. These solids will consist primarily of neutralized ash and will contain only small amounts of carbon and soluble alkali metal compounds. This material may be disposed of by landfill, used for construction purposes, or employed in other applications.

It will be apparent from the foregoing that the alkali metal extraction portion of the process results in the recovery of alkali metal constituents from the solids to produce a relatively concentrated alkali metal solution which is withdrawn from the extraction system through line 74. This solution contains aluminum and silicon compounds in addition to the alkali metal salts of the acid. Studies indicate that these compounds are present as a result of high temperature solid phase reactions of the alkali metal catalyst residues with kaolin-type coal minerals such as $Al_2Si_2O_5(OH)_4$ in the gasifier solids. For potassium carbonate, for example, these reactions can be represented as follows:

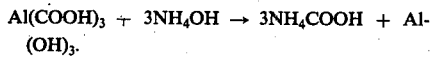

The extent to which this reaction takes place is a function of time and temperature. Laboratory studies of the reaction in which stoichiometric mixtures of potassium carbonate and kaolin were heated together for five hours showed conversions ranging from one percent by weight at a temperature of 1000° F. to complete conversion at 1500° F. The potassium aluminosilicate which is thus formed reacts with the acid during the extraction step of the process to form soluble aluminum and silicon compounds. For formic acid, this reaction can be represented by the following equation:

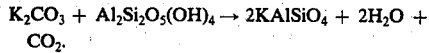

Equations corresponding to those set forth above can be written for other acids which react to form similar aluminum and silicon compounds in the enriched alkali metal solution. These compounds, if present in the solution used to impregnate the feed coal prior to its introduction into the gasifier, will react under gasifier conditions to form potassium aluminosilicate and similar complex compounds which have relatively little catalytic activity. To avoid this tying up of the alkali metal constituents in the form of compounds of reduced activity, soluble aluminum and silicon compounds are removed from the enriched alkali metal solution before it is returned to the feed separation zone 14.

Soluble aluminum compounds are separated from the alkali metal solution by introducing the solution from line 74 into an agitated mixer or similar vessel 120. Here the solution is mixed with sufficient base introduced through line 121 to raise the pH of the solution to a value in excess of about seven. This results in conversion of the soluble aluminum salt of the acid to the insoluble hydroxide. For a formic acid system in which ammonium hydroxide is used as the base, this step can be represented by the equation:

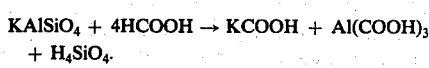

Equations similar to that above can be written to illustrate the use of other bases. Any of a variety of strong bases can be employed to precipitate the aluminum as the hydroxide but it is generally preferred to employ ammonium hydroxide or an alkali metal hydroxide. It is particularly preferred to employ the hydroxide of the alkali metal used as the catalyst in the gasification step of the process because this provides an effective means for adding makeup alkali metal to the system. The amount of base required will depend in part, of course, on the pH of the solution recovered from the acid extraction step of the process, the amount of aluminum formate, aluminum sulfate, aluminum carbonate, aluminum acetate or other aluminum salt present, and the concentration of the basic solution used. If more base than is required for catalyst makeup purposes is needed, a mixture of alkali metal hydroxide and ammonium hydroxide can be employed. This is generally the preferred procedure.

The slurry of aluminum hydroxide in alkali metal solution which is produced in mixer 120 is withdrawn through line 122 and passed by means of pump 123 through line 124 to hydroclone or other solids-liquid separation device 125. Although the use of a hydroclone for recovery of the aluminum hydroxide from the solution is generally preferred, a filter and a suitable filter aid if needed to improve filterability of the aluminum hydroxide, a centrifuge, or other separation device can be employed. The aluminum hydroxide is recovered as underflow from the hydroclone or other separation device through line 126 and can be further processed for recovery of the aluminum as the metal or the production of other aluminum compounds, aluminum nitrate and aluminum sulfate useful as fertilizers for example. The aluminum thus recovered constitutes a valuable by-product of the process of the invention. In a large catalytic coal gasification plant processing twelve thousand tons per day of coal having a one percent aluminum content to produce two hundred fifty million standard cubic feet of product gas per day, for example, a total of about one hundred and twenty tons per day of aluminum can be recovered as the hydroxide.

The sale of this material produces an additional return from the process and thus reduces the overall cost of the product gas.

The solution from which aluminum hydroxide has been recovered is taken off as overflow from hydroclone or similar separation device 125 through line 126. This solution contains orthosilicic acid, $H_4SiO_4$, produced during the acid extraction step of the process. To avoid the buildup of silicon compounds within the system, it is preferred to pass the solution from line 126 into a partial evaporator to similar device 127 and heat the solution to a temperature sufficient to drive off water and convert the orthosilicic acid to metasilicic acid and silicon dioxide in accordance with the reactions:

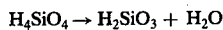

$$H_4SiO_4 \rightarrow H_2SiO_3 + H_2O$$

$$H_2SiO_3 \rightarrow SiO_2 + H_2O$$

The second reaction shown above will normally not go to completion and only a relatively small amount of the silicon dioxide will generally be formed. The insoluble silicon compounds are withdrawn through line 128 and may be used for landfill or other purposes. The water vapor liberated, and ammonia formed from any ammonium hydroxide in the system, is taken overhead from the evaporator through line 129 and after cooling in a heat exchanger not shown in the drawing is recycled to the mixer 120. Makeup potassium hydroxide may be added to this stream through line 130. The alkali metal solution recovered following removal of the silicon compounds is recycled through line 18 to the feed preparation step of the process.

It will be apparent from the foregoing that the process of the invention provides an improved alkali metal recovery system which has numerous advantages over systems proposed in the past. It makes possible significantly better carbon utilization than might otherwise be obtained during coal gasification and similar high temperature operations carried out in the presence of alkali metal-containing catalysts, improves catalyst effectiveness by reducing the amount of alkali metal tied up in relatively ineffective complex compounds, decreases the quantity of acid required for the recovery of water-insoluble alkali metal constituents, permits the recycle of high carbon char particles to the gasification step of the process, provides a convenient and effective way of adding makeup alkali metal constituents to the system, and permits the recovery of substantial quantities of aluminum as a valuable by-product of the process. As a result of these advantages, the process may have widespread application.

We claim:

1. A process for the recovery of alkali metal catalyst residues from a mixture of solid particles containing said alkali metal catalyst residues, carbonaceous solids, and ash particles including iron, aluminum and silicon compounds, said mixture being produced by the gasification of carbonaceous solids in the presence of an alkali metal catalyst, which comprises magnetically removing iron constituents from said mixture of solid particles to produce solids of reduced iron content; treating said solids of reduced iron content with an acid solution in which said alkali metal catalyst residues are soluble and recovering a spent acid solution containing soluble alkali metal compounds, soluble aluminum salts, and soluble silicon compounds; raising the pH of said spent acid solution sufficiently to precipitate said soluble aluminum compounds contained in the spent acid solution as aluminum hydroxide, and thereafter separately recovering said aluminum hydroxide and a solution containing said soluble alkali metal compounds and said soluble silicon compounds.

2. A process as defined by claim 1 wherein said carbonaceous solids comprise coal.

3. A process as defined by claim 1 wherein said solids of reduced iron content are treated with said acid solution in a multistage countercurrent liquid-solids extraction system.

4. A process as defined by claim 1 wherein said acid solution comprises formic acid.

5. A process as defined by claim 1 wherein said acid solution comprises sulfuric acid.

6. A process as defined by claim 1 wherein the pH of said spent acid solution is raised to a value above about 7.0 by the addition of ammonium hydroxide to said spent solution.

7. A process as defined by claim 1 wherein said alkali metal catalyst residues comprise a potassium compound.

8. A process as defined by claim 1 wherein said alkali metal catalyst residues comprise a cesium compound.

9. A process as defined by claim 1 including the additional step of separating high carbon content particles having a density less than that of said spent acid solution from low carbon content particles of higher density following the magnetic removal of said iron constituents from said mixture of solid particles.

10. A process as defined by claim 1 including the additional step of heating said solution containing said soluble alkali metal compounds and said soluble silicon compounds, following the precipitation of said soluble aluminum compounds as aluminum hydroxide, to a temperature sufficient to precipitate silicon as orthosilicic acid and recovering an alkali metal solution of reduced silicon content.

11. A process as defined by claim 1 wherein said mixture of solid particles comprises char particles withdrawn from a fluidized bed gasifier.

12. A process as defined by claim 1 wherein said mixture of solid particles comprises fines produced by the gasification of said carbonaceous solids.

13. A process as defined by claim 1 wherein said pH of said spent acid solution is raised to a value above about 7.0 by the addition of an alkali metal hydroxide to said solution.

14. A process for the recovery of alkali metal compounds from a mixture of solids including char particles, ash containing iron, aluminum and silicon compounds, and alkali metal catalyst residues, said mixture being produced by the high temperature gasification of coal in the presence of an alkali metal-containing catalyst, which comprises magnetically separating magnetic iron constituents from said mixture of solids and recovering solids of reduced iron content; separating said solids of reduced iron content into a first fraction of relatively high carbon content and relatively low ash content and a second fraction of relatively low carbon content and relatively high ash content; extracting alkali metal compounds, aluminum compounds, and silicon compounds from said second fraction with a solution of an acid which reacts with alkali metal compounds present in said fraction to form soluble salts and recovering a spent acid solution enriched in alkali metal compounds; raising the pH of said spent acid solution to a level above about 7.0 and removing precipitated aluminum hydroxide from said spent solution; heating said spent solution sufficiently to drive off water and precipitate silicon solution sufficiently to drive off water and precipitate silicon compounds; and recovering an alkali metal compound solution.

15. A process as defined by claim 14 wherein said acid comprises formic acid and said mixture of solids comprises solid particles withdrawn from a fluidized bed gasifier.

16. A process as defined by claim 14 wherein said acid comprises sulfuric acid and said mixture of solids comprises gasifier fines.

* * * * *